2,837,494

SILICONE RUBBER OF IMPROVED THERMAL STABILITY CONTAINING TRIORGANOPHOSPHINE OXIDE

Alfred R. Gilbert and Simon W. Kantor, Schenectady, N. Y., assignors to General Electric Company, a corporation of New York No Drawing. Application December 28, 1954
Serial No. 478,179

20 Claims. (Cl. 260—37)

This invention relates to modified silicone compositions. More particularly, the invention is concerned with compositions of matter comprising (1) an organopolysiloxane convertible, e. g., by heat, to the solid elastic state and (2) from 0.001 to 10.0 percent, by weight, based on the weight of the organopolysiloxane, of a triorganophosphine oxide, the cured articles derived from said mixture of ingredients having improved thermal stability over the same cured compositions in which the aforesaid organophosphine oxide is omitted.

Silicone rubbers in the cured, substantially infusible and insoluble state have found eminent use in many applications where continued exposure at elevated temperatures without undue deterioration is a requirement. Thus, these silicone rubbers are perfectly satisfactory for applications requiring the unusually high continuous temperature of about 250° C. However, there has been a need for silicone rubbers which can withstand temperatures in excess of 250° C., e. g. temperatures of about 300° C.

We have now discovered that a new class of materials is effective in improving the thermal stability of silicone rubbers so that these rubbers are able to withstand continuous exposure to temperatures as high as 300° C. without decomposition of the rubber. The new materials used as thermostabilizers in the silicone rubbers are the triorganophosphine oxides. These triorganophosphine oxides have the formula (1)    (R)₃PO where R represents members selected from the class consisting of alkyl radicals, e. g., methyl, ethyl, propyl, butyl, decyl, octadecyl, etc. radicals; cycloalkyl radicals, e. g., cyclohexyl, cycloheptyl, etc. radicals; aryl radicals, e. g., phenyl, naphthyl, tolyl, ethylphenyl, etc. radicals; aralkyl radicals, e. g., benzyl, phenylethyl, etc. radicals; haloaryl radicals, e. g., chlorophenyl, dibromophenyl, etc. radicals; and mixtures of the aforesaid members.

The triorganophosphine oxides used in the practice of the present invention are well known to the art and a great number of these compounds are described in chapter six of "Organophosphorus Compounds" by Kosolapoff, John Wiley & Sons, New York (1950). These organophosphine oxides may be prepared by a plurality of different methods. One method of preparing these compounds is by the decomposition of quaternary phosphonium hydroxides. This decomposition can be accomplished by evaporating the water from an aqueous solution of quaternary phosphonium hydroxide by heating under low pressures. The phosphonium hydroxides used to form the organophosphine oxides are well known compounds and may be prepared, for example, by forming the Grignard reagent of an alkyl halide, or cycloalkyl halide, or a mixture of alkyl halides and/or cycloalkyl halides. The Grignard reagent may then be converted to a phosphine by reaction with phosphorus trichloride. The phosphine may then be isolated by fractional distillation and converted to the corresponding phosphonium iodide by reaction with an alkyl iodide. The iodide may be converted to the quaternary phosphonium hydroxide by reacting the iodide with an aqueous suspension of silver oxide. The silver iodide which is formed during the course of this reaction precipitates from solution leaving an aqueous solution of the quaternary phosphonium hydroxide.

The amounts of these organophosphine oxides which may be incorporated into convertible organopolysiloxanes in the practice of our invention may be varied, depending on such conditions as the type of convertible organopolysiloxane employed, the kind of filler used in making the silicone rubber, the specific organophosphine oxide employed, the application for which the converted silicone rubber is intended, etc. Generally, we employ from about 0.001 to 10.0 percent, by weight, of the organophosphine oxide and preferably from 0.01 to 1.0 percent, by weight, of the organophosphine oxide, based on the weight of the convertible organopolysiloxane.

The convertible organopolysiloxane compositions employed in the practice of the present invention, which may be highly viscous masses or gummy, elastic solids, depending on the state of condensation, the condensing agent employed, the starting organopolysiloxane used to make the convertible organopolysiloxane, etc., will be referred to hereinafter as "convertible organopolysiloxane" or more specifically as "convertible methylpolysiloxane." Although convertible organopolysiloxanes with which the present invention is concerned are well known, for purposes of showing persons skilled in the art the various convertible organopolysiloxanes which may be employed in the practice of the present invention, attention is directed to the convertible compositions disclosed and claimed in Agens Patent 2,448,756, issued September 7, 1948, Sprung et al. Patent 2,448,556, issued September 7, 1948, Sprung Patent 2,484,595, issued October 11, 1949, Krieble Patent 2,457,688, issued December 28, 1948, Hyde Patent 2,490,357, issued December 5, 1949, Marsden Patent 2,521,528, issued September 5, 1950, and Warrick Patent 2,541,137, issued February 13, 1951.

It will, of course, be understood by those skilled in the art that other convertible organopolysiloxanes containing the same or different silicon-bonded organic substituents (e. g., methyl, ethyl, propyl, phenyl, tolyl, xylyl, benzyl, phenylethyl, naphthyl, chlorophenyl, both methyl and phenyl, etc. radicals) connected to silicon atoms by carbon-silicon linkages, may be employed without departing from the scope of the invention. The particular convertible organopolysiloxane used is not critical and may be any one of those described in the foregoing patents which are generally obtained by condensation of a liquid organopolysiloxane containing an average of from about 1.95, preferably from about 1.98, to about 2.01 organic groups per silicon atom. The usual condensing agent which may be employed and which are well known in the art for that purpose, may include, for instance, ferric chloride hexahydrate, phenylphosphoryl chloride, alkaline condensing agents such as potassium hydroxide, sodium hydroxide, cesium hydroxide, rubidium hydroxide, etc. Solid tetramethyl ammonium hydroxide or solid benzyltrimethyl ammonium hydroxide may also be used as a condensing agent. These convertible organopolysiloxanes generally comprise polymeric diorganosiloxanes which may contain, for example, up to 2 mole percent copolymerized monoorganosiloxane, for example, copolymerized monomethylsiloxane. Generally, we prefer to use as the starting liquid organopolysiloxane from which the convertible, for example, heat-convertible, organopolysiloxane is prepared, one which contains about 1.999 to 2.005, inclusive, organic groups, for example, methyl groups, per silicon atom and where more than about 90 percent, preferably 95 percent, of the silicon atoms in the organopolysiloxane contain two silicon-bonded alkyl groups.

The starting organopolysiloxanes used to make the convertible organopolysiloxane by condensation thereof preferably comprise organic constituents consisting essentially of monovalent organic radicals attached to silicon through carbon-silicon linkages, there being on the average between 1.95 and 2.01 organic radicals per silicon atom, and in which the siloxane units consist of units of the structural formula (R')$_2$SiO where R' is preferably a radical of the group consisting of methyl and phenyl radicals. At least 90 percent of the total number of R' groups are preferably methyl radicals. The polysiloxane may be one in which all of the siloxane units are (CH$_3$)$_2$SiO or the siloxane may be a copolymer of dimethylsiloxane and a minor amount, e. g., from about 1 to 20 mole percent of any of the following units, alone or in combination therewith:

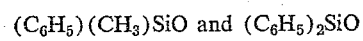

(C$_6$H$_5$)(CH$_3$)SiO and (C$_6$H$_5$)$_2$SiO

A small amount of a cure accelerator, for instance, benzoyl peroxide, tertiary butyl perbenzoate, zirconyl nitrate, etc., may be incorporated in the convertible organopolysiloxane for the purpose of accelerating its cure as is more particularly described in various patents calling for the use of these materials as cure accelerators for silicone rubber. The cure accelerator functions to yield cured products having better properties, for example, improved elasticity, tensile strength, and tear resistance than is obtained by curing similar convertible organopolysiloxane compositions containing no cure accelerator. The amount of cure accelerator which may be used may be varied, for example, from about 0.1 to about 8 percent or more, and preferably from about 1 to 4 percent, by weight, of the cure accelerator, based on the weight of the convertible organopolysiloxane.

The convertible organopolysiloxane may be compounded on ordinary rubber compounding differential rolls, with various fillers, for example, silica, silica aerogel, titanium dioxide, calcium silicate, ferric oxide, chromic oxide, cadmium sulfide, asbestos, glass fibers, calcium carbonate, carbon black, lithopone, talc, etc. Where the convertible organopolysiloxane is compounded with any of the fillers mentioned above, the triorganophosphine oxide may be mixed with the convertible organosiloxane during the compounding operation. This is accomplished by merely adding the triorganophosphine oxide to the convertible organopolysiloxane and the filler prior to the addition of the mixture to the milling rolls or while the mixture is on the milling rolls. Where no filler is to be incorporated in the organopolysiloxane, the triorganophosphine oxide may still be incorporated into the convertible organopolysiloxane on rubber milling rolls, or may be dispersed in the convertible organopolysiloxane in any suitable manner. After forming the mixture of the convertible organopolysiloxane, the triorganophosphine oxide, and the filler where a filler is employed, the resulting mixture may be molded, extruded or otherwise shaped as by heating under pressure to form products having physical characteristics, e. g., elasticity, compressibility, etc., similar to those of natural rubber and other known synthetic rubbers.

The elastomers comprising the cured organopolysiloxane of the present invention are particularly characterized by their improved thermal stability as evidenced by their ability to withstand continuous exposure to temperatures as high as 300° C.

In order that those skilled in the art may better understand how the present invention may be practiced, the following examples are given by way of illustration and not by way of limitation. All parts are by weight.

EXAMPLE 1

A highly viscous convertible organopolysiloxane, specifically a polymeric dimethyl siloxane, substantially non-flowable at room temperature, was prepared by condensing at a temperature of about 140° C. for about 6 hours, octamethylcyclotetrasiloxane with about 0.01 percent, by weight, of potassium hydroxide. This polymer was soluble in benzene and had slight flow at room temperature. One hundred parts of this convertible organopolysiloxane was mixed with 40 parts of silica aerogel (Santocel-C, manufactured by the Monsanto Chemical Company) and 1.7 parts of benzoyl peroxide, and 0.1 part of tri-n-butyl phosphine oxide and the resulting mixture was milled on differential rubber compounding rolls until a uniform mixture was obtained. A similar milled mixture was formed as a control which did not contain any of the tri-n-butyl phosphine oxide. Both of these milled mixtures were press cured at 120° C. for 20 minutes followed by heat aging for one hour at 150° C. Both of the samples were then heat aged for 24 hours at 250° C., and then one portion of each material was aged for 88 hours at 300° C. and another portion of each material was heat aged for 2 hours at 325° C. The effect of heat aging on these two materials was determined by measuring the tensile strength and percent elongation of the samples wherever possible and by examining the physical appearance of the material. Table I below shows the results of the heat treatment of the stabilized rubber (the rubber prepared above with the tri-n-butyl phosphine oxide additive) and the control. As shown by this table both of the materials are satisfactory at the end of 24 hours at 250° C. However, after further aging at 300° C. or at 325° C. the properties of the control fall off to a point where the rubber is no longer usable, while the stabilized rubber maintains relatively good properties.

Table 1

| | 24 hrs., 250° C. | 88 hrs., 300° C. | 2 hrs., 325° C. |
|---|---|---|---|
| Stabilized rubber. | 691 p. s. i., 383% elong. | 675 p. s. i., 100% elong., flexible, surface O. K. | Flexible, surface, O. K. |
| Control | 795 p. s. i., 375% elong. | 410 p. s. i., 10% elong., cracks on bending, surface oxidized. | Badly cracked, surface completely oxidized. |

EXAMPLE 2

Another highly viscous convertible organopolysiloxane, specifically a polymeric dimethyl siloxane, substantially non-flowable at room temperature, was prepared by condensing at a temperature of about 140° C. for about 6 hours, octamethylcyclotetrasiloxane with about 0.01 percent, by weight, of potassium hydroxide. This polymer was soluble in benzene and had slight flow at room temperature. One hundred parts of this convertible organopolysiloxane was compounded with 45 parts of silica aerogel (specifically Santocel-C manufactured by Monsanto Chemical Company) and 1.65 parts of benzoyl peroxide on differential rubber milling rolls until a uniform mixture was obtained. A stabilized mixture was prepared from the above mixture by milling 100 parts of the above mixture with 0.07 part of tri-n-butyl phosphine oxide. Another stabilized mixture was prepared by milling 100 parts of the original mixture with 0.36 part of tri-n-butyl phosphine oxide. A control, containing no tri-n-butyl phosphine oxide, the mixture containing 0.07 part, and the mixture containing 0.36 part were press cured at 120° C. for 20 minutes followed by an oven cure for one hour at 150° C. All three of these samples were heat aged for 24 hours at 250° C. and a portion of each sample was heat aged at 300° C. after the 250° C. heat aging, and another portion of the control and the 0.36 part stabilizer mixture was heat aged at 325° C. after the 250° C. Table II below lists the physical characteristics of these three samples after the heat aging process. The three samples are identified as the control, the 0.07 part stabilizer material and the 0.36 part stabilizer material.

*Table II*

|  | 24 hrs., 250° C. | 40 hrs., 300° C. | 2 hrs., 325° C. |
|---|---|---|---|
| Control | 752 p. s. i., 300% elong. | Surface oxidized, 0% elong.; could not measure tensile. | Completely oxidized to sand. |
| 0.07 part stabilizer. | 819 p. s. i., 300% elong. | 634 p. s. i., 125% elong. |  |
| 0.36 part stabilizer. | 846 p. s. i., 350% elong. | 689 p. s. i., 125% elong. | 569 p. s. i., 200% elong. |

EXAMPLE 3

Following the procedure of Example 2, 100 parts of the mixture of that example (100 parts of convertible dimethyl polysiloxane, 45 parts of silica aerogel, and 1.65 parts of benzoyl peroxide) were milled with 0.36 part of diphenylmethylphosphine oxide. A sample of this stabilized mixture and a sample of the unstabilized mixture as a control were press cured at 120° C. for 20 minutes followed by an oven cure for one hour at 150° C. Both of these samples were heat aged for 24 hours at 250° C. and then further heat cured at 300° C. Table III below lists the results of this heat cure.

*Table III*

|  | 24 hrs., 250° C. | 40 hrs., 300° C. | 65 hrs., 300° C. | 136 hrs., 300° C. |
|---|---|---|---|---|
| Control | 752 p. s. i., 300% elong. | Surface oxidized, 0% elong.; could not measure tensile. | Completely oxidized to sand. |  |
| Stabilized rubber | 850 p. s. i., 300% elong. | 736 p. s. i., 125% elong. | Very flexible, has good physical properties. | Still flexible, 700 p. s. i. |

It will, of course, be apparent to those skilled in the art that in addition to the convertible organopolysiloxanes employed in the foregoing examples, other organopolysiloxanes many examples of which have been given previously, can be used without departing from the scope of the invention. Additionally, other types of vulcanization accelerators or cure accelerators besides the benzoyl peroxide described may also be employed. Various other fillers may be used and obviously the amount of filler may be varied considerably depending, for example, on the particular filler employed, its particle size, and the specific convertible organopolysiloxane used, the purpose for which the finished product is to be used, etc. Thus, filled organopolysiloxanes may be produced containing, for example, from about 20 to 150 percent, by weight, filler based on the weight of the convertible organopolysiloxane present. Generally, the filler on a weight basis may be employed in an amount equal to from about 0.15 to 3 parts of filler per part of convertible organopolysiloxane, for example, heat convertible polydimethylsiloxanes. When one employs, for instance, silica aerogel as a filler, the amount of such filler which may properly and advantageously be used with the convertible organopolysiloxane is much less than usual fillers, especially when the benzene soluble diorganosiloxane described above having slight flow at room temperature is used. In such instances the amount of silica aerogel which may be tolerated in the filled composition is generally below 50 to 60 parts of silica aerogel filler per 100 parts of the convertible organopolysiloxane.

Obviously, the amount of the specific additive used in the practice of the present invention may also be varied over a wide range. Generally, we have found that no particular advantage is derived from incorporating amounts of additive in excess of about 10 percent. Finally, it will also be apparent that other triorgano-phosphine oxides such as those within the scope of Formula 1 may also be employed. These other triorganophosphine oxides include, for example, triphenylphosphine oxide, phenyldicyclohexylphosphine oxide, dibenzylethylphosphine oxide, tritolylphosphine oxide, tri-(chlorophenyl)-phosphine oxide, dibutyloctadecylphosphine oxide, etc. The preferred triorganophosphine oxide employed in the practice of the present invention is diphenylmethylphosphine oxide because of its ease of preparation from readily available compounds.

The products of this invention are useful in applications such as, for example, gaskets, tubing, electrical insulation (e. g., as conductor insulation, etc.), shock absorbers, etc. They are particularly suitable for use as gaskets in applications involving high temperatures, e. g., temperatures of from 250° to 300° C. where silicone rubbers without the additives of the present invention and other synthetic rubbers fail owing to the deleterious effect of heat. Elastomers produced by the practice of our invention have the additional property of retaining their flexibility at low temperatures, e. g., temperatures as low as —60° C.

What we claim as new and desire to secure by Letters Patent of the United States is:

1. A curable composition of matter comprising (1) an organopolysiloxane convertible to the cured, solid, elastic state, said organopolysiloxane having an average of from 1.95 to 2.01 organic groups selected from the class consisting of alkyl, aryl, aralkyl, and haloaryl radicals per silicon atom, with at least 90 percent of the silicon atoms in said organopolysiloxane containing two silicon-bonded alkyl radicals, and (2) from 0.001 to 10 percent, by weight, based on the weight of the convertible organopolysiloxane, of a triorganophosphine oxide having the formula $$(R)_3PO$$

where R represents members selected from the class consisting of alkyl, cycloalkyl, aryl, aralkyl and haloaryl radicals and mixtures of said members.

2. A curable composition of matter comprising (1) a dimethylsiloxane convertible to the cured, solid, elastic state and (2) from 0.001 to 10 percent, by weight, based on the weight of the dimethylsiloxane, of a triorganophosphine oxide having the formula $$(R)_3PO$$

where R represents members selected from the class consisting of alkyl, cycloalkyl, aryl, aralkyl and haloaryl radicals and mixtures of said members.

3. An elastomer comprising the heat-cured elastic product of claim 2.

4. A product comprising a cured, solid, elastic organopolysiloxane, said organopolysiloxane having an average of from 1.95 to 2.01 organic groups selected from the class consisting of alkyl, aryl, aralkyl, and haloaryl radicals per silicon atom, with at least 90 percent of the silicon atoms in said organopolysiloxane containing two silicon-bonded alkyl radicals, said organopolysiloxane having incorporated therein prior to curing from 0.001 to 10 percent, by weight, based on the weight of organopolysiloxane, of an additive for improving the thermal stability of the aforesaid organopolysiloxane, the said additive being a triorganophosphine oxide having the formula $$(R)_3PO$$

where R represents members selected from the class consisting of alkyl, cycloalkyl, aryl, aralkyl and haloaryl radicals and mixtures of said members.

5. A curable composition of matter comprising (1) an organopolysiloxane convertible to the cured, solid, elastic state, said organopolysiloxane having an average of from 1.95 to 2.01 organic groups selected from the class consisting of alkyl, aryl, and haloaryl radicals per silicon atom, with at least 90 percent of the silicon atoms in said organopolysiloxane containing two silicon-bonded alkyl radicals, and (2) from 0.001 to 10 percent, by weight, based on the weight of the organopolysiloxane, of tri-n-butylphosphine oxide.

6. An elastomer comprising the heat-cured elastic product of claim 5.

7. A curable composition of matter comprising (1) an organopolysiloxane convertible to the cured, solid, elastic state, said organopolysiloxane having an average of from 1.95 to 2.01 organic groups selected from the class consisting of alkyl, aryl, aralkyl, and haloaryl radicals per silicon atom, with at least 90 percent of the silicon atoms in said organopolysiloxane containing two silicon-bonded alkyl radicals, and (2) from 0.001 to 10 percent, by weight, based on the weight of said organopolysiloxane, of diphenylmethylphosphine oxide.

8. An elastomer comprising the heat-cured elastic product of claim 7.

9. A curable composition of matter comprising (1) an organopolysiloxane convertible to the cured, solid, elastic state, said organopolysiloxane having an average of from 1.95 to 2.01 organic groups selected from the class consisting of alkyl, aryl, aralkyl, and haloaryl radicals per silicon atom, with at least 90 percent of the silicon atoms in said organopolysiloxane containing two silicon-bonded alkyl radicals, (2) from 0.001 to 10 percent, by weight, of a triorganophosphine oxide having the formula $$(R)_3PO$$

where R represents members selected from the class consisting of alkyl, coalkyl, aryl, aralkyl, and haloaryl radicals and mixtures of said members, (3) from 0.1 to 4 percent, by weight, of a cure accelerator, and (4) a filler, the weights of (2) and (3) being based on the weight of the organopolysiloxane.

10. A curable composition of matter comprising (1) a polydimethylsiloxane convertible to the cured, solid, elastic state, (2) from 0.001 to 10 percent, by weight, of tri-n-butylphosphine oxide, (3) from 0.1 to 4 percent, by weight, of benzoyl peroxide, and (4) a filler comprising silica aerogel, the weight of (2) and (3) being based on the weight of the polydimethylsiloxane.

11. A product comprising the cured composition of claim 10.

12. A curable composition comprising (1) a polydimethylsiloxane convertible to the cured, solid, elastic state and (2) from 0.001 to 10 percent, by weight, of diphenylmethylphosphine oxide, (3) from 0.1 to 4 percent, by weight, of benzoyl peroxide, and (4) a filler comprising silica aerogel, the weights of (2) and (3) being based on the weight of the polydimethylsiloxane.

13. A product comprising the cured elastic composition of claim 12.

14. A curable composition of matter comprising (1) a polydimethylsiloxane convertible by heat to the cured, solid, elastic state and (2) from 0.001 to 10 percent, by weight, based on the weight of the polydimethylsiloxane of tri-n-butylphosphine oxide.

15. An elastomer comprising the heat-cured elastic product of claim 14.

16. A curable composition of matter comprising (1) a polydimethylsiloxane convertible by heat to the cured, solid, elastic state and (2) from about 0.001 to 10 percent, by weight, based on the weight of the polydimethylsiloxane, of diphenylmethylphosphine oxide.

17. A product comprising the cured composition of claim 16.

18. The method which comprises (1) incorporating a cure accelerator and from 0.001 to 10 percent, by weight, of a triorganophosphine oxide having the formula $$(R)_3PO$$

where R represents members selected from the class consisting of alkyl, cycloalkyl, aryl, aralkyl, and haloaryl radicals and mixtures of said members, into a curable composition comprising an organopolysiloxane convertible by heat to the cured, solid, elastic state, said organopolysiloxane having an average of from 1.95 to 2.01 organic groups selected from the class consisting of alkyl, aryl, aralkyl, and haloaryl radicals per silicon atom, with at least 90 percent of the silicon atoms in said organopolysiloxane containing two silicon-bonded alkyl radicals, the said triorganophosphine oxide being capable of improving the thermal stability of the cured organopolysiloxane, and (2) curing the resulting composition under the influence of heat.

19. The method of claim 18 in which the triorganophosphine oxide is tri-n-butylphosphine oxide.

20. The method of claim 18 in which the triorganophosphine oxide is diphenylmethylphosphine oxide.

References Cited in the file of this patent

UNITED STATES PATENTS

| | | |
|---|---|---|
| 2,673,210 | Frisch | Mar. 23, 1954 |
| 2,739,952 | Linville | Mar. 27, 1956 |

OTHER REFERENCES

Pfeifer et al.: India Rubber World, January 1954, vol. 129, No. 4, pp. 481–484 and 488.